United States Patent
Edwards et al.

(10) Patent No.: US 7,034,971 B2
(45) Date of Patent: Apr. 25, 2006

(54) FABRICATION OF SANDWICHED CONSTRUCTION MEDIA

(75) Inventors: Jathan D. Edwards, Afton, MN (US); Frank E. Aspen, St. Paul, MN (US); Ramon F. Hegel, North St. Paul, MN (US); Chad R. Sandstrom, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/962,630

(22) Filed: Oct. 11, 2004

(65) Prior Publication Data

US 2005/0041272 A1 Feb. 24, 2005

Related U.S. Application Data

(60) Continuation of application No. 10/781,439, filed on Feb. 18, 2004, now Pat. No. 6,850,345, which is a continuation of application No. 10/441,426, filed on May 19, 2003, now abandoned, which is a division of application No. 09/812,518, filed on Mar. 20, 2001, now Pat. No. 6,611,365.

(51) Int. Cl.
*G03H 1/02* (2006.01)

(52) U.S. Cl. ............ 359/3; 359/7; 359/900; 428/64.4; 369/283

(58) Field of Classification Search ............ 359/1, 359/3, 7, 900; 428/64.2, 64.4, 67.9, 65.1, 428/65.2; 369/283
See application file for complete search history.

(56) References Cited

U.S. PATENT DOCUMENTS

| | | | |
|---|---|---|---|
| 4,330,604 A | 5/1982 | Wreede et al. | |
| 4,992,336 A | 2/1991 | Yamamoto et al. | |
| 5,233,597 A | 8/1993 | Nakayama et al. | |
| 5,279,689 A | 1/1994 | Shvartsman | |
| 5,326,240 A | 7/1994 | Kudo et al. | |
| 5,458,985 A | 10/1995 | Isono et al. | |
| 5,460,763 A | 10/1995 | Asai | |
| 5,470,627 A | 11/1995 | Lee et al. | |
| 5,476,700 A | 12/1995 | Asai et al. | |
| 5,487,926 A | 1/1996 | Kuribayashi et al. | |
| 5,582,891 A | 12/1996 | Murakami et al. | |
| 5,597,613 A | 1/1997 | Galarneau et al. | |
| 5,673,251 A | 9/1997 | Suzuki et al. | |
| 5,675,570 A | 10/1997 | Ohira et al. | |
| 5,719,691 A | 2/1998 | Curtis et al. | |
| 5,812,288 A | 9/1998 | Curtis et al. | |

(Continued)

FOREIGN PATENT DOCUMENTS

DE 4208328 9/1993

(Continued)

OTHER PUBLICATIONS

Psaltis et al., "Holographic storage using shift multiplexing," Optics Letters, vol. 20, No. 7, Apr. 1, 1995, pp. 782-784.

(Continued)

*Primary Examiner*—Fayez G. Assaf
(74) *Attorney, Agent, or Firm*—Eric D. Levinson

(57) ABSTRACT

In one embodiment, holographic data storage medium includes a first thermoplastic substrate portion having a thickness less than approximately 2 millimeters and a second thermoplastic substrate portion having a thickness less than approximately 2 millimeters. A holographic recording material may be sandwiched between the first and second thermoplastic substrate portions. By making thermoplastic substrate portions sufficiently thin, edge wedge problems can be avoided.

22 Claims, 8 Drawing Sheets

U.S. PATENT DOCUMENTS

| | | | |
|---|---|---|---|
| 5,827,593 | A | 10/1998 | Maruyama et al. |
| 5,838,650 | A | 11/1998 | Campbell et al. |
| 5,874,187 | A | 2/1999 | Colvin et al. |
| 5,876,823 | A | 3/1999 | Nagashima |
| 5,893,998 | A | 4/1999 | Kelley et al. |
| 5,917,798 | A | 6/1999 | Horimai et al. |
| 5,932,042 | A | 8/1999 | Gensel et al. |
| 6,042,684 | A | 3/2000 | Ohman |
| 6,108,297 | A | 8/2000 | Ohta et al. |
| 6,132,545 | A | 10/2000 | Motokawa et al. |
| 6,348,983 | B1* | 2/2002 | Curtis et al. ............ 359/3 |
| 6,425,968 | B1 | 7/2002 | Eichlseder |
| 6,538,776 | B1 | 3/2003 | Edwards |
| 6,611,365 | B1 | 8/2003 | Edwards et al. |
| 6,625,100 | B1 | 9/2003 | Edwards |
| 6,650,447 | B1 | 11/2003 | Curtis et al. |
| 6,707,787 | B1* | 3/2004 | Yamasaki et al. ....... 369/283 |
| 2002/0114027 | A1 | 8/2002 | Horimai |
| 2004/0191684 | A1* | 9/2004 | Maruyama et al. .... 430/270.11 |
| 2005/0206984 | A1* | 9/2005 | Kawano et al. ............ 359/8 |
| 2005/0250016 | A1* | 11/2005 | Takeyama .................. 430/1 |

FOREIGN PATENT DOCUMENTS

| | | |
|---|---|---|
| EP | 0 386 971 A1 | 9/1999 |
| JP | 61126648 | 6/1986 |
| JP | 63-74618 | 4/1988 |
| JP | 63124247 | 5/1988 |
| JP | 2-134219 | 5/1990 |
| JP | 05278088 | 10/1993 |
| JP | 9-295319 | 11/1997 |
| JP | 10-230524 | 9/1998 |
| WO | WO 98/47143 | 10/1998 |
| WO | WO 00/48172 A2 | 8/2000 |

OTHER PUBLICATIONS

Pu et al., "High-density recording in photopolymer-based holographic three-dimensional disks," Applied Optics, vol. 35, No. 14, May 1996, pp. 2389-2398.

Barbastathis et al., "Shift multiplexing with spherical reference waves," Applied Optics, vol. 35, No. 14, May 1996, pp. 2403-2417.

Psaltis et al., "Holographic Data Storage," Computer IEEE, Feb. 1998, pp. 52-60.

Dhar et al., "Holographic storage of multiple high-capacity digital data pages in thick photopolymer system," Optics Letters, vol. 23, No. 21, Nov. 1, 1988, pp. 1710-1712.

Curtis et al., "High Density, High Performance Data Storage via Volume Holography: The Lucent Technologies Hardware Platform," Bell Laboratories, Lucent Technologies, pp. 1-9, published in 2000 by Holographic Data Storage, Ed. Coufal et al.

Ashley et al., "Holographic data storage," IBM J. Res Develop, vol., 44, No. 3, May 3, 2000, pp. 341-368.

* cited by examiner

FABRICATION OF SANDWICHED CONSTRUCTION MEDIA

This Application is a continuation of U.S. application Ser. No. 10/781,439 filed Feb. 18, 2004, now U.S. Pat. No. 6,850,345 which is a continuation of U.S. application Ser. No. 10/441,426 filed May 19, 2003, now abandoned, which is in turn a divisional of U.S. application Ser. No. 09/812,518, filed Mar. 20, 2001, now U.S. Pat. No. 6,611,365.

This invention was made with Government support under Agreement No. NMA02-97-9-1050 with the National Imagery and Mapping Agency of the United States Department of Defense. The Government has certain rights in this invention.

FIELD

The present invention relates to holographic data storage media.

BACKGROUND

Many different types of data storage media have been developed to store information. Traditional media, for instance, include magnetic media, optical media, and mechanical media to name a few. Increasing data storage density is a paramount goal in the development of new or improved types of data storage media.

In traditional media, individual bits are stored as distinct mechanical, optical, or magnetic changes on the surface of the media. For this reason, medium surface area may pose physical limits on data densities.

Holographic data storage media can offer higher storage densities than traditional media. In a holographic medium, data can be stored throughout the volume of the medium rather than the medium surface. Moreover, data can be superimposed within the same media volume through a process called shift multiplexing. For these reasons, theoretical holographic storage densities can approach tens of terabits per cubic centimeter.

In holographic data storage media, entire pages of information can be stored as optical interference patterns within a photosensitive optical material. This can be done by intersecting two coherent laser beams within the optical material. The first laser beam, called the object beam, contains the information to be stored; and the second, called the reference beam, interferes with the object beam to create an interference pattern that can be stored in the optical material as a hologram. When the stored hologram is later illuminated with only the reference beam, some of the reference beam light is diffracted by the hologram. Moreover, the diffracted light creates a reconstruction of the original object beam. Thus, by illuminating a recorded hologram with the reference beam, the data encoded in the object beam can be recreated and detected by a data detector such as a camera.

SUMMARY OF THE INVENTION

The invention is directed towards holographic data storage media, holographic data storage systems, and methods for making holographic data storage media. The holographic data storage media may incorporate thermoplastic substrates having reduced substrate thicknesses. Moreover, in some embodiments, holographic data storage media incorporate thermoplastic substrates within a particular thickness range.

In one embodiment, a holographic data storage medium may include a first thermoplastic substrate portion having a thickness less than or approximately equal to 2 millimeters, a second thermoplastic substrate portion having a thickness less than or approximately equal to 2 millimeters, and a holographic recording material sandwiched between the first and second thermoplastic substrate portions. By way of example, the first and second thermoplastic substrate portions may be made of at least one of the following: polycarbonate, polymethylmethacrylate (PMMA), and amorphous polyolefin. The holographic recording material may be made of a photopolymer.

The holographic data storage medium, for instance, may take the form of a disk or a card. The first and second thermoplastic substrate portions may be injection molded substrate portions. As will be described in detail below, an edge wedge phenomenon associated with injection molded thermoplastic substrates can make fabrication of holographic data storage media challenging. To overcome problems introduced by the edge wedge phenomenon, the invention may involve the use of substrate portions with reduced thicknesses. For instance, each of the first and second thermoplastic substrate portions may have thicknesses less than or equal to approximately 2 millimeters, less than or equal to approximately 1.2 millimeters, or even less than or equal to approximately 0.6 millimeters.

Optimal substrate thicknesses may have a lower limit determined by other variables such as birefringence and stiffness. Therefore, in one particular embodiment, each of the first and second thermoplastic substrate portions have thicknesses less than 1.3 millimeters and greater than 0.5 millimeters. 1.3 millimeters to 0.5 millimeters, for instance, may define an optimal thermoplastic substrate thickness range.

In other embodiments, the invention may comprise a holographic data storage system. The system may include a laser that produces at least one laser beam and optical elements through which the laser beam passes. The system may also include a data encoder, such as a spatial light modulator, that encodes data in at least part of the laser beam. In addition, the system may include a holographic recording medium that stores at least one hologram. The holographic recording medium, for instance, may include one or more of the features mentioned above, such as thin thermoplastic substrate portions. The system may also include a data detector, such as a camera, that detects the hologram.

In yet another embodiment, the invention may comprise a method of fabricating holographic media. The method may include injection molding a first substrate portion and a second substrate portion, and depositing a photopolymer between the first and second substrate portions. Injection molding the first and second thermoplastic substrate portions, for instance, may comprise injection molding the first and second thermoplastic substrate portions to have sufficiently thin substrate thicknesses. Depositing the photopolymer may comprise injecting the photopolymer between the first and second substrate portions. For instance, for a disk shaped medium, the photopolymer may be injected by center dispensing the photopolymer through an inner diameter of the substrate portions of the medium. The method may also include forcing the first substrate portion onto an upper reference plane and forcing the second substrate portion onto a lower reference plane. The photopolymer may then be cured in situ.

Substrate thicknesses less than or equal to approximately 2.0 millimeters, less than or equal to approximately 1.2 millimeters, or less than or equal to approximately 0.6 millimeters may be highly advantageous. In particular, substrate thicknesses in these ranges may minimize the negative effects of the edge wedge phenomenon that is described in detail below. Briefly, the edge wedge phenomenon is the result of differential cooling of the thermoplastic material as it solidifies in an injection molding cavity. The differential cooling, for instance, can result in substrates that exhibit cusps at the substrate edges that are thicker than the average thickness of the substrate.

Other factors, such as birefringence and stiffness, however, may make thicker substrates more desirable. The range of 0.5 millimeters to 1.3 millimeters, for instance, may define an optimal thermoplastic substrate thickness range for sandwich construction holographic media.

Additional details of these and other embodiments are set forth in the accompanying drawings and the description below. Other features, objects and advantages will become apparent from the description and drawings, and from the claims.

DETAILED DESCRIPTION

Figure 1:
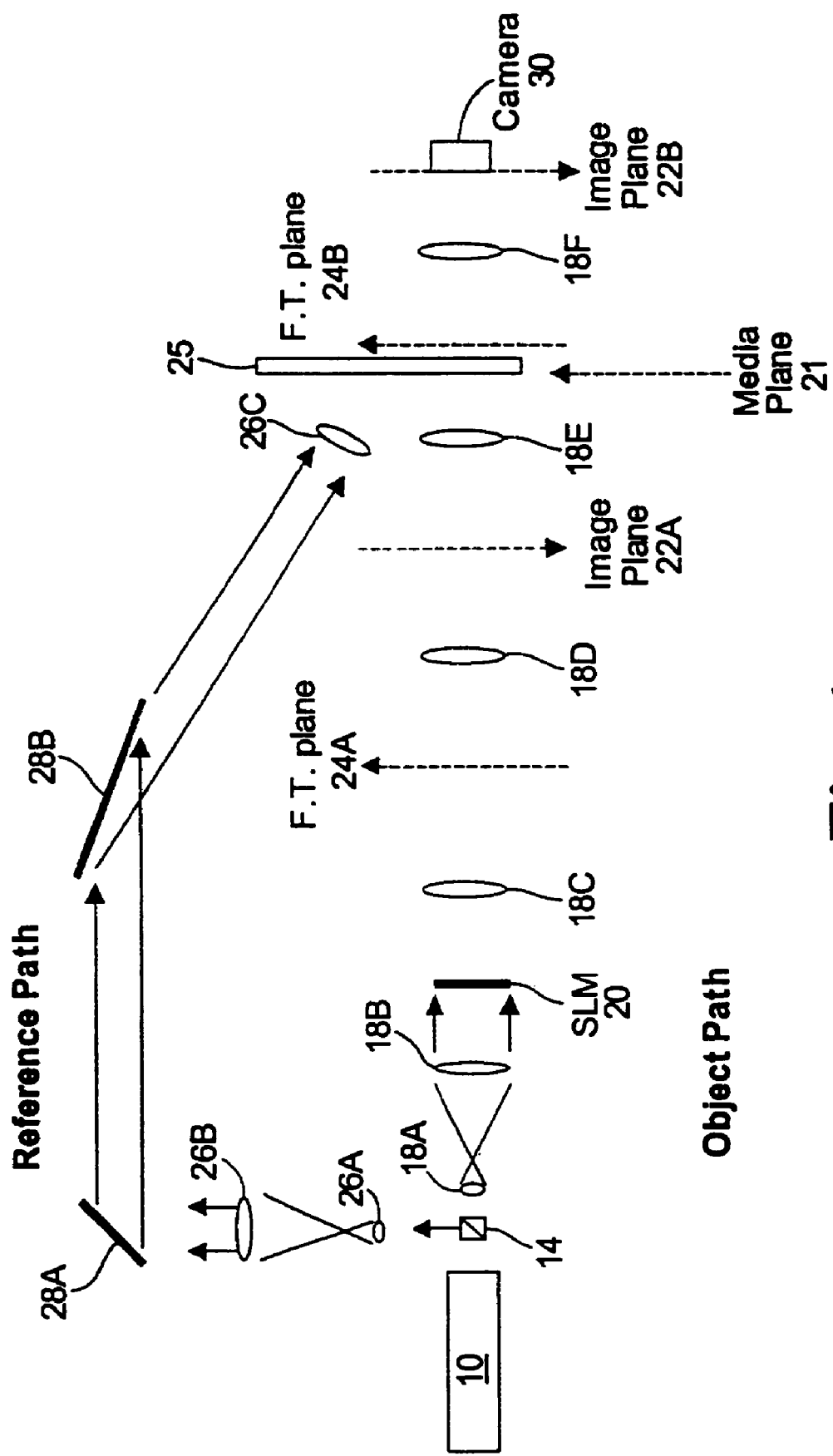
FIG. 1 illustrates an optical arrangement for holographic recording.

FIG. 1 illustrates an optical arrangement for holographic recording. As shown in FIG. 1, laser 10 produces laser light that is divided into two components by beam splitter 14. These two components generally have an approximately equal intensity and may be spatially filtered to eliminate optical wave front errors.

The first component exits beam splitter 14 and follows an object path. This "object beam" may then pass through a collection of object beam optical elements 18A–18E and a data encoder such as a Spatial Light Modulator (SLM) 20. For instance, lens 18A may expand the laser light and lens 18B may condition the laser light so that the photons are traveling substantially parallel when they enter SLM 20.

Figure 2:
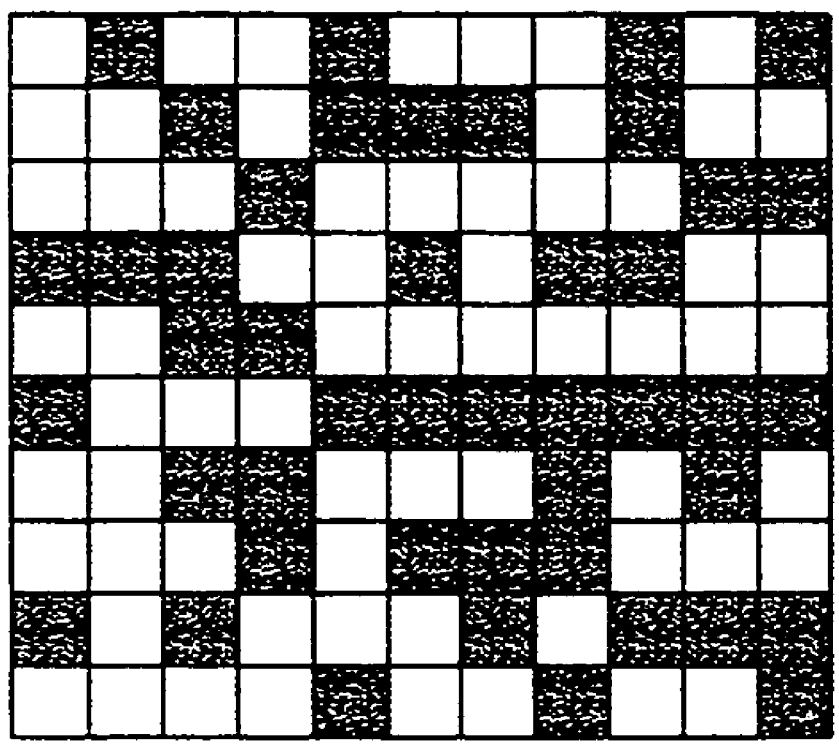
FIG. 2 is an enlarged view of an exemplary 10 by 10 bit pixel array that can be stored on a holographic medium as a hologram.

SLM 20 may encode data in the object beam, for instance, in the form of a holographic bit map (or pixel array). FIG. 2, for instance, shows an enlarged view of an exemplary 10 by 10 bit pixel array. The encoded object beam may pass through lenses 18C, 18D, and 18E before illuminating a holographic recording media plane 21. In this conventional "4F" configuration, lens 18C is located one focal length from SLM 20 and one focal length from Fourier transform plane 24A. Lens 18D is located one focal length from Fourier transform plane 24A and one focal length from image plane 22A. Lens 18E is located one focal length from image plane 22A and one focal length from Fourier transform plane 24B.

The second component exits the beam splitter 14 and follows a reference path. This "reference beam" may be directed by reference beam optical elements such as lenses 26 and mirrors 28. The reference beam illuminates the media plane 21, interfering with the object beam to create a hologram on medium 25. By way of example, medium 25 may take the form of a disk shaped medium or a card shaped medium. For instance, if the medium takes the form of a disk, the disk may be rotatable within a holographic disk drive to read and write data.

In order to provide increased storage density, storage medium 25 is typically located in proximity to one of the Fourier transform planes. Using an optical arrangement similar to that shown in FIG. 1, for example, the data encoded in the object beam by SLM 20 can be recorded in medium 25 by simultaneously illuminating the object and reference paths.

After a hologram has been stored on the medium 25, the data encoded in the hologram may be read, again, e.g., using an optical arrangement similar to that shown in FIG. 1. For readout of the data, only the reference beam is allowed to illuminate the hologram on medium 25. Light diffracts off the hologram stored on medium 25 to reconstruct or "recreate," the object beam, or a beam of light that is substantially equivalent to the original encoded object beam. This recreated object beam passes through lens 18F, permitting a reconstruction of the bit map that was encoded in the object beam to be observed at image plane 22B. Therefore, a data detector, such as camera 30 can be positioned at image plane 22B to read the data encoded in the hologram.

The holographic bit map encoded by SLM 20 comprises one "page" of holographic data. For instance, the page may be an array of binary information that is stored in a particular location on the holographic medium as a hologram. By way of example, a typical page of holographic data may be 1000 bit by 1000 bit pixel array that is stored in 1 square millimeter of medium surface area, although the scope of the invention is not limited in that respect. Because holographic data is stored throughout the medium volume, however, sequential pages may be overlapped in the recording process by a process called shift multiplexing.

Figure 3:
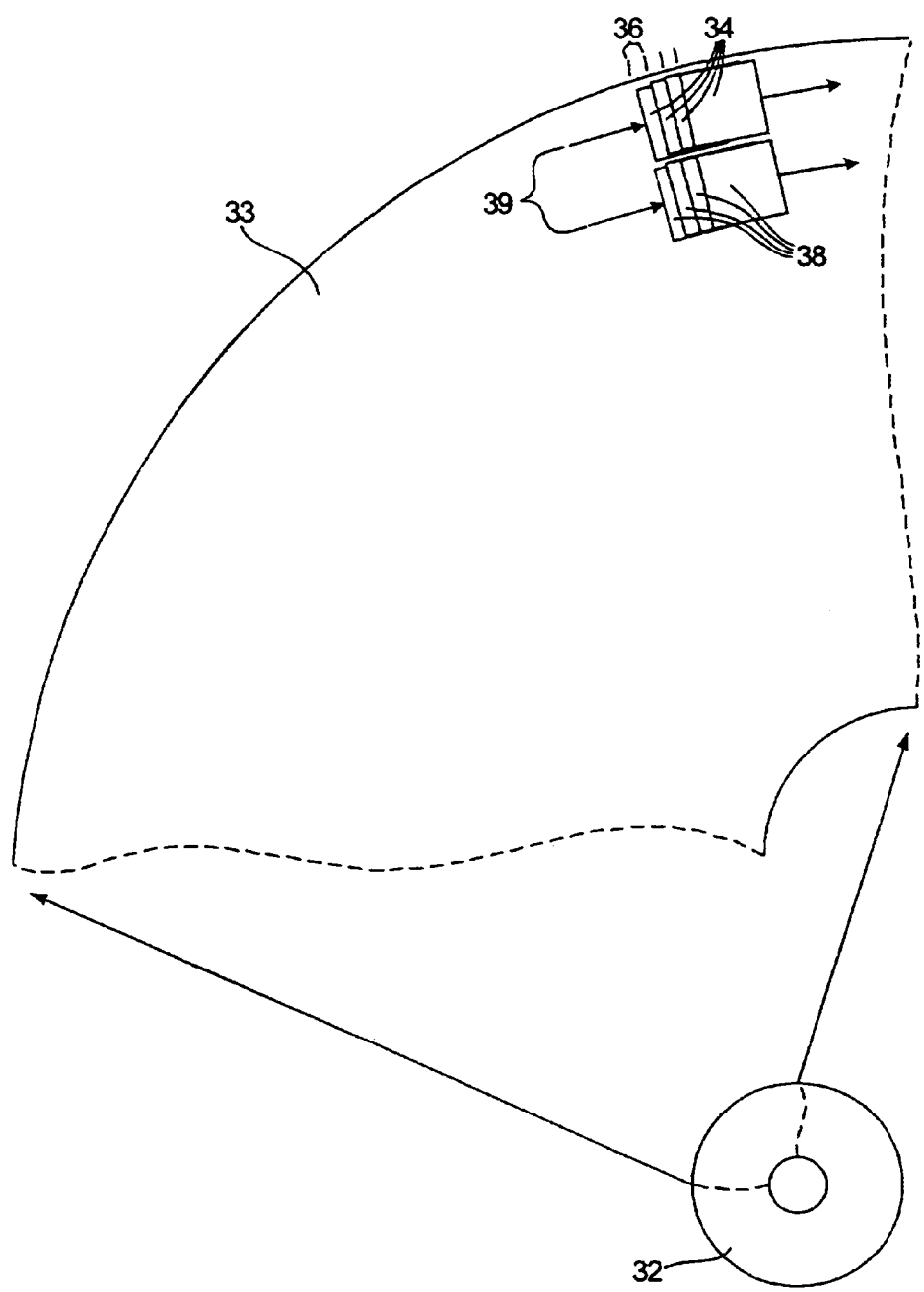
FIG. 3 illustrates how sequential pages or pixel arrays may be stored on a holographic data storage medium.

In one type of shift multiplexing of holographic data pages, sequential pages are recorded at shifted locations around the medium. The shift distances are typically much less than the recorded area in one dimension (the down-track dimension) and approximately equal to the recorded area in the other dimension (the cross-track dimension). FIG. 3, for example, illustrates how sequential pages may be stored on medium 32. A portion 33 of medium 32 is enlarged for illustrative purposes. As shown, sequential pages of data 34 are overlapped in the down-track dimension 36. Later pages 38 in the sequence of pages also overlap one another in the down-track dimension 36 but do not overlap pages in the cross-track dimension 39. The respective pages of data, for instance, may each cover approximately 1 square millimeter of surface area on the medium. The down-track dimension, for instance may be approximately 10 microns, while the cross-track dimension may be approximately 1 millimeter.

In an alternative type of shift multiplexing, sometimes referred to as phase correlation multiplexing, sequential pages are overlapped in the recording process in both the cross track dimension and the down track dimension.

In order to precisely locate track locations, a holographic data storage system may implement one or more tracking techniques. Exemplary tracking techniques, for instance, are described in commonly assigned U.S. Pat. No. 6,625,100. The content of the above-identified application is hereby incorporated herein by reference in its entirety.

Figure 4A:
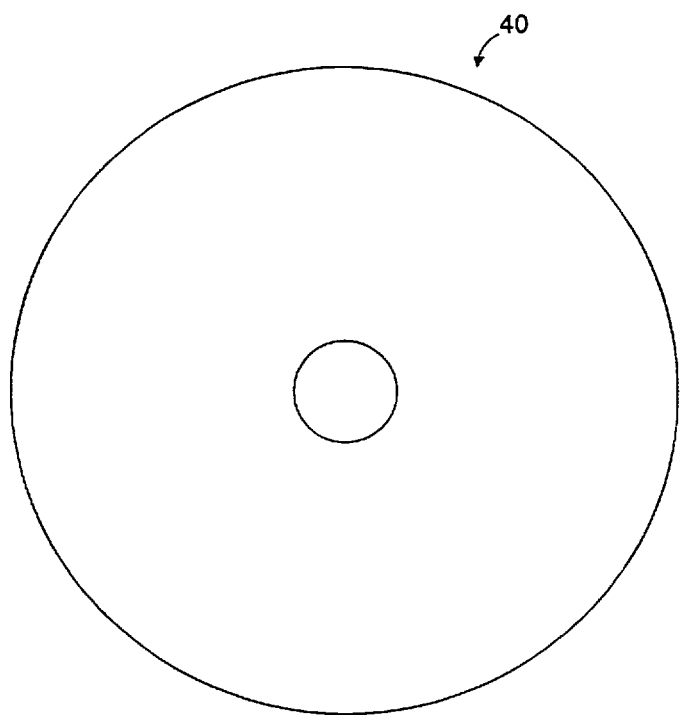
FIGS. 4A and 4B illustrate an exemplary holographic data storage medium in accordance with one embodiment of the invention.
Figure 4B:
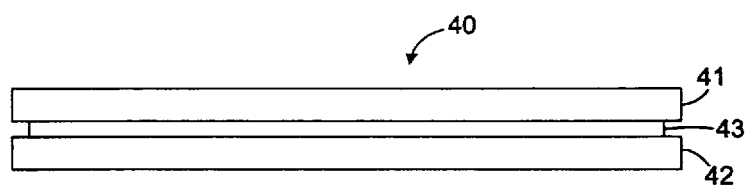

FIGS. 4A and 4B illustrate an exemplary embodiment of a holographic data storage medium 40. FIG. 4A is a top view illustrating the disk shape of medium 40. FIG. 4B is a cross sectional view illustrating the sandwich construction of medium 40. For instance, medium 40 includes a substrate having a first thermoplastic substrate portion 41 and a second thermoplastic substrate portion 42. Holographic recording material 43 may comprise a photopolymer that is sandwiched between the respective substrate portions 41, 42. By way of example, the substrate portions 41, 42 may be made of at least one of the following: polycarbonate, polymethylmethacrylate, or amorphous polyolefin. One of these exemplary thermoplastics or another thermoplastic, for example, may be used to make substrate portions 41, 42 in an injection-molding tool.

Figure 5:
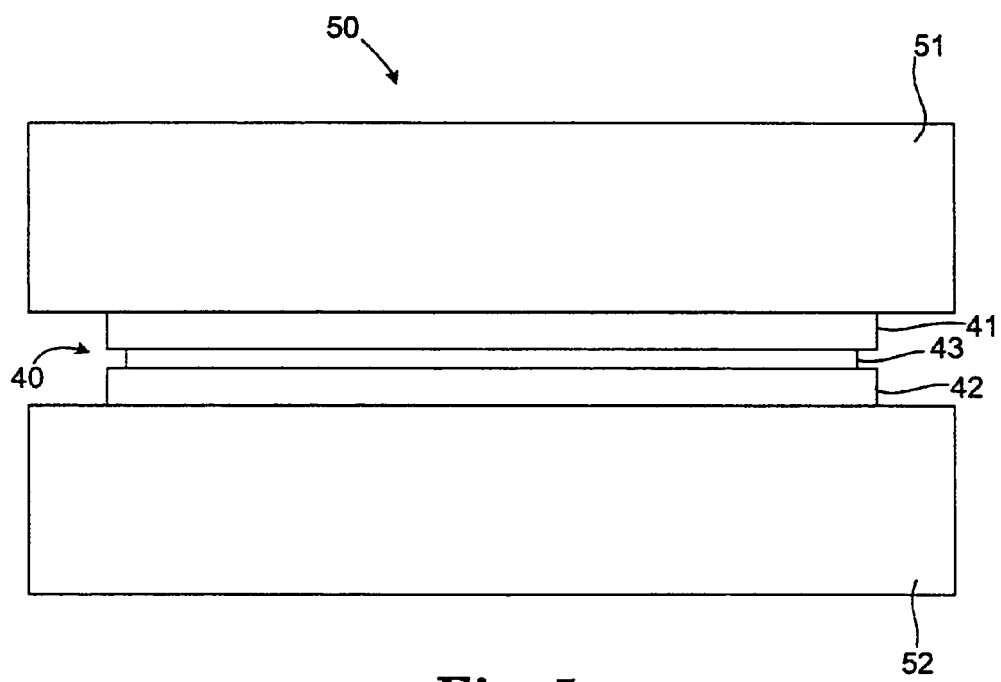
FIG. 5 illustrates an exemplary system for fabricating holographic data storage media.

FIG. 5 illustrates an exemplary system for fabricating high optical quality holographic data storage media. The system 50 may include at least two flat portions 51, 52. To fabricate a holographic medium 40, thermoplastic substrate portions 41, 42 may be forced against the respective flat portions 51, 52 so that the outer surface of the substrate portions 41, 42 substantially conform to respective flat portions 51, 52. For example, a force may be applied via a vacuum, or the force may come from hydraulic pressure, e.g., if holographic recording material 43 is injected between the substrate portions.

A holographic recording material 43 may be dispensed between the respective thermoplastic substrate portions 41, 42. For instance, for a disk shaped medium, the holographic recording material 43 may be injected by center dispensing a photopolymer through an inner diameter of the thermoplastic substrate portions 41, 42. In center dispensing, the photopolymer material flows radially to fill the cavity between the substrate portions 41, 42. Photopolymer material flow lines may be symmetric to the disk shaped medium. As mentioned above, if the holographic recording material is dispensed via injection, the injection process may also force the thermoplastic substrate portions 41, 42 against the respective flat portions 51, 52.

By way of example, the first and second flat portions 51, 52 may be positioned to define upper and lower reference planes. After dispensing the holographic recording material, e.g., via the center dispensing method mentioned above, the upper flat portion 51 or lower flat portion 52 may be adjusted slightly so that the parallelism of medium surface is maintained throughout medium fabrication. For high optical quality holographic media, substrate portions 41, 42 may need to be parallel to within one optical fringe.

For example, an interferometer may be implemented to measure parallelism. Alternatively, the system 50 may be mechanically pre-calibrated to ensure that the upper and lower surfaces of the resulting fabricated media will be sufficiently parallel. If the system is mechanically pre-calibrated to ensure parallelism, the positions of the upper and lower flat portions 51, 52 may be carefully pre-defined so that the upper and lower surfaces of the resulting fabricated media will be sufficiently parallel. In addition, if the system is mechanically pre-calibrated, an interferometer used to monitor parallelism may be unnecessary.

Holographic recording material, for instance, may be a photopolymer material. After the medium has been fabricated, the holographic recording material may have a thickness of approximately one millimeter. Thermoplastic substrate portions 42, 43 may each have thickness less than or equal to approximately 2 millimeters, less than or equal to approximately 1.2 millimeters, or even less than or equal to approximately 0.6 millimeters. Thus, the total thickness of the holographic recording medium may be less than or equal to approximately 5 millimeters, less than or equal to approximately 3.4 millimeters, or even less than or equal to approximately 2.2 millimeters. As described below, however, an optimal range of respective substrate thicknesses may fall within 0.5 millimeters to 1.3 millimeters.

Thermoplastic substrate portions 42, 43, for instance, may be comprised of a suitable thermoplastic such as polycarbonate, polymethylmethacrylate, amorphous polyolefin, or the like. Moreover, thermoplastic substrate portions 42, 43 may be fabricated by an injection molding process. Injection molding the substrates, for instance, can provide many advantages in fabrication.

For instance, injection molded substrates can be mass-produced at relatively low cost. Moreover, the injection molds may be adapted to provide the substrates with additional features such as surface variations that are optically detectable. These optically detectable surface variations can carry precision tracking and/or pre-format information. Commonly-assigned U.S. Pat. No. 6,625,100, for instance, describes how prerecorded surface variations may provide precision tracking features to a holographic medium. For these and other reasons, it may be highly advantageous to fabricate the respective substrate portions by injection molding.

Injection molding the thermoplastic substrate portions, however, raises additional challenges. For instance, injection molding can result in substrate portions exhibiting an "edge wedge" phenomenon. The "edge wedge" phenomenon is the result of the cooling and solidification of the thermoplastic in an injection mold. As a thermoplastic material cools and solidifies in an injection mold, the thermoplastic material at the inner and outer edges of the mold may cool at a different rate than the rest of the thermoplastic material.

This differential cooling can result in a substrate thickness that is non-uniform. For instance, small cusps at the edges of an injection molded disk substrate may have a thickness that is greater than the average disk thickness. The presence of such cusps is referred to as the "edge wedge" phenomenon or "edge wedge" problem.

Figure 6B:
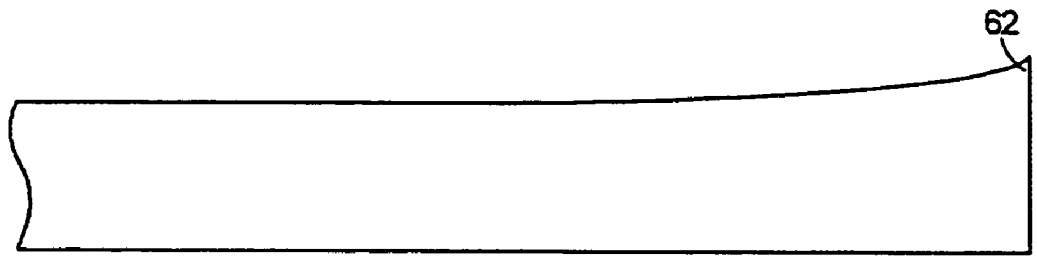
FIGS. 6A and 6B illustrate an exemplary substrate exhibiting cusps.
Figure 6A:
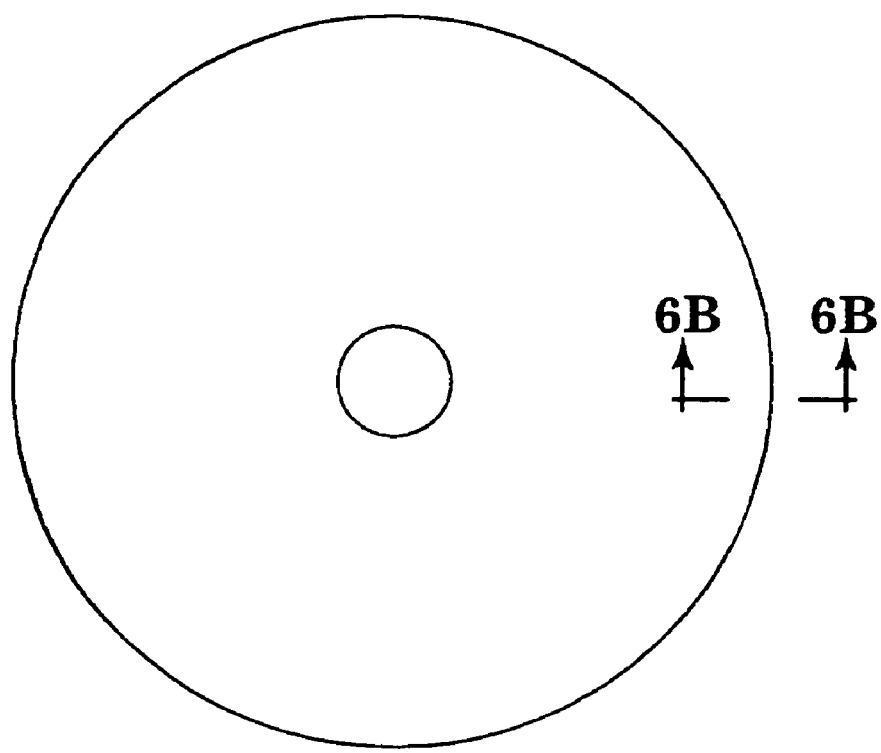

FIGS. 6A–6B illustrate an exemplary substrate 60 exhibiting a cusp 62 caused by the edge wedge phenomenon. FIG. 6A is a top view of substrate 60 and FIG. 6B is an enlarged cross sectional view of the outer edges of substrate 60. As shown in FIG. 6B, outer edges of substrate 60 exhibits a cusp 62 that makes the outermost substrate thickness larger than the average substrate thickness. In addition, at any location within the mold cavity wherein there is a thermal gradient in the molding tool, an edge wedge phenomenon may occur. For example, one or more edge wedge cusps may also be observed at or near the inner diameter of substrate 60.

Figure 7:
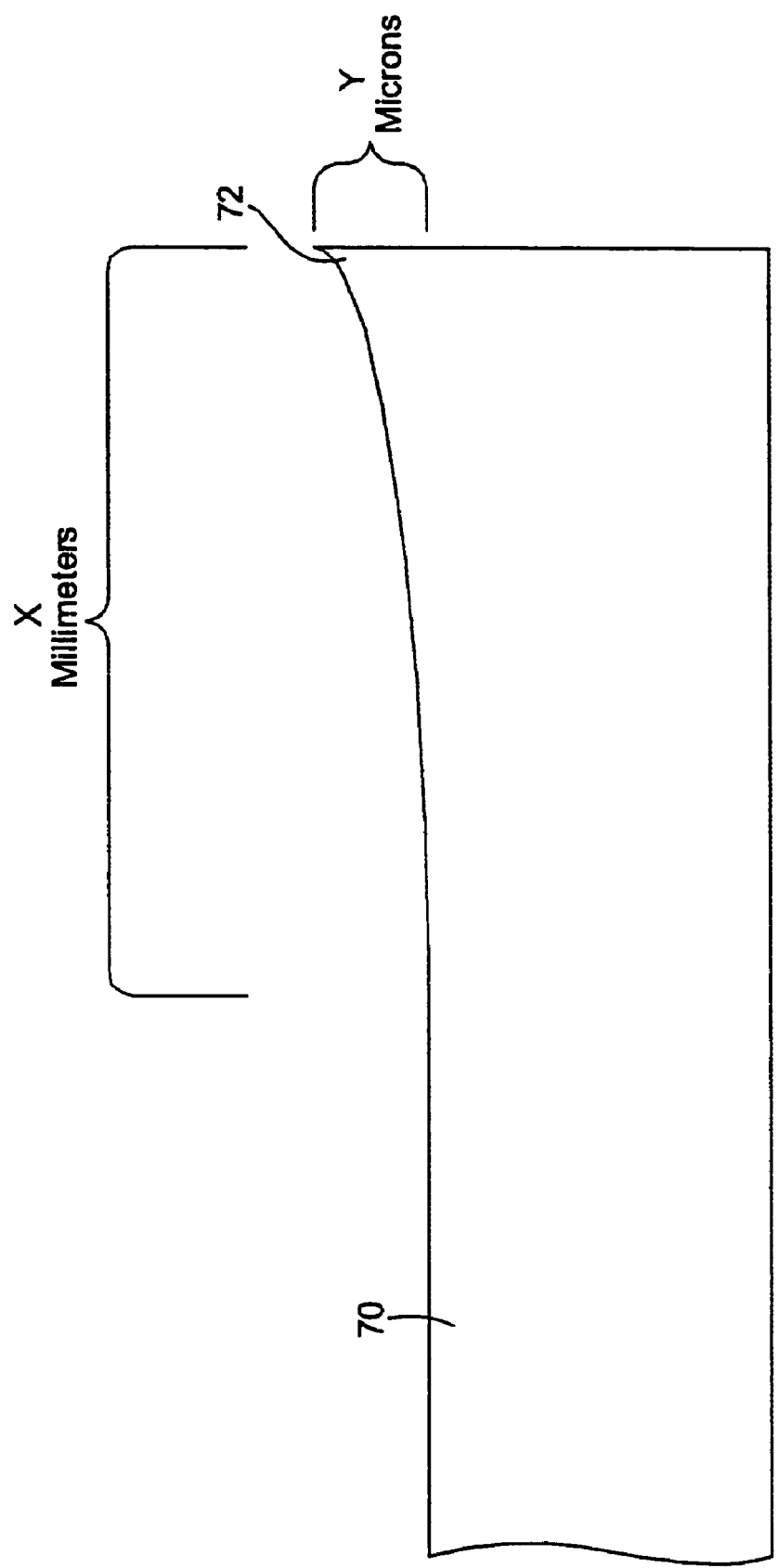
FIG. 7 is an enlarged cross sectional view of an edge of a substrate that exhibits a cusp caused by the edge wedge phenomenon.

FIG. 7 is an enlarged cross sectional view of an edge of substrate 70 exhibiting a cusp 72 caused by the edge wedge phenomenon. For example, FIG. 7 may correspond to either the inner or outer edge of a disk shaped substrate. As shown, the extent of the edge wedge phenomenon can be measured with variables X and Y. The variable Y can be used to measure the difference between the maximum thickness of the disk at a cusp and the average thickness of the disk. The variable X can be used to measure the distance between an edge of the disk and the point on the disk where the disk thickness becomes substantially uniform. By way of example, the variable X may be typically about 1–2 millimeters and the variable Y may be on the order of tens of microns.

Experimental data has shown that the edge wedge phenomenon increases as substrate thickness increases. For instance, as the thickness of an injection molded substrate increases, the variables X and Y, as shown in FIG. 7, increase. In other words, the size of the cusps that result because of the edge wedge phenomenon become larger as the thickness of the substrate increases. And similarly, the edge wedge phenomenon decreases as substrate thickness decreases.

The edge wedge phenomenon presents a significant obstacle to the fabrication of high optical quality holographic media. Referring again to FIG. 5, substrate portions 41 and 42 are forced against the respective flat portions 51, 52. However, if substrate portions 41, 42 exhibit cusps, e.g., as the result of the edge wedge phenomenon, the presence of cusps on the edges of substrate portions 41, 42 may undermine the ability to achieve uniform holographic recording material thickness. If substrate portions 41, 42 exhibit cusps, for example, it can be particularly difficult to ensure that the outer surface of substrate portions 41, 42 are parallel to within one optical fringe.

In short, the presence of cusps can undermine the ability to create a high optical quality holographic data storage medium. For instance, if substrate portions cannot be uniformly forced against reference planes (such as flat portions 51, 52 as shown in FIG. 5), high optical quality holographic data storage disks fabrication techniques may be ineffective. Moreover, even if disk fabrication is still possible, the usefulness of the disk can be reduced by the presence of cusps on the substrate portions. For instance, the storage density of the disk may be reduced if, during media fabrication, the substrate portions cannot be made to be sufficiently parallel to cause the holographic recording material to have a substantially uniform thickness.

To overcome problems relating to the edge wedge phenomenon, substrate portions may be fabricated to be sufficiently thin. In this manner, the edge wedge phenomenon may be reduced dramatically. In particular, thinner injection molded substrates exhibit smaller edge wedge phenomenon cusps. For instance, referring again to FIG. 7, the variable Y can be reduced significantly when the thickness of injection molded substrates is reduced. Specifically, substrate portion thickness less than or equal to approximately 2 millimeters, less than or equal to approximately 1.2 millimeters, and even less than or equal to approximately 0.6 millimeters are useful to overcome edge wedge problems.

As mentioned above, however, other media design variables such as birefringence and media stiffness may pose limitations on how thin a useful substrate can be made. In general, thicker substrates are stiffer and have lower birefringence. Thus, as described in the example below, there may exist an optimal substrate thickness range in which a number of variable fall within acceptable range for a high quality sandwich construction holographic data storage medium.

EXAMPLE

In experiments, thermoplastic materials such as polycarbonate, polymethylmethacrylate, and amorphous polyolefin are injection molded to fabricate 120-millimeter diameter substrates and 130-millimeter diameter substrates having thicknesses of 2.0 millimeters, 1.2 millimeters and 0.6 millimeters. The edge wedge is then measured for each respective substrate thickness, e.g., by measuring the variable Y as shown in FIG. 7. Holographic data storage media are then fabricated using the respective substrates of differing thicknesses and the media fabrication techniques described above.

The experimental results show that the 2.0 millimeter substrates typically exhibit an edge wedge of approximately Y=20 microns, the 1.2 millimeter substrates typically exhibit an edge wedge of approximately Y=10 microns, and the 0.6 millimeter substrates typically exhibit an edge wedge of approximately Y=4 microns. Thus, the results show that the edge wedge phenomenon decreases with decreasing substrate thicknesses.

Also measured are the birefringence of each substrate (i.e., a measure of the variation of the index of refraction with orientation in the material). The experimental results show that birefringence is approximately 30 nanometers for the 2.0 and 1.2 millimeter substrates and increases to approximately 60 nanometers for the 0.6 millimeter substrates. Thus, the results show that birefringence increases with decreasing substrate thickness, and in particular, that birefringence increases dramatically for substrate thickness less than or approximately equal to 0.6 millimeters.

The experimental results described above clearly show the edge wedge advantages that can be achieved by decreasing the size of the substrate portions in a sandwiched construction holographic data storage medium. Substrate portions having a thickness of 2.0 millimeters or less appear to be adequate for some implementations, but substrate portions having a thickness of 1.2 millimeters or less exhibit smaller cusps. Moreover, substrate portions having a thickness of 0.6 millimeters or less had even smaller cusps. Substrate portions having a thickness of 0.6 millimeters had an acceptable, yet much higher birefringence than the thicker substrate portions. As substrate portions get much thinner than 0.5 millimeters, for example, birefringence may increase to unacceptable levels.

In addition to overcoming the edge wedge problems, thinner substrates also produce advantages in overall media thickness. Thinner substrates, for instance, can reduce the total material cost of an individual medium. There may, however, be a lower limit to the thickness of a substrate portion that could be dictated, e.g., by substrate birefringence, stiffness, and/or other factors such as environmental protection capability. In short, the optimal thickness range for thermoplastic substrate portions for use in a sandwich construction holographic data storage medium is approximately 0.5 millimeters to 1.3 millimeters.

As mentioned above, substrate portions may be formed from a thermoplastic such as a polycarbonate, polymethylmethacrylate, amorphous polyolefin, or the like. For injection molded substrates, several factors may determine which substrate material is best suited for media fabrication. For instance, the substrate material should be capable of confining a viscous photopolymer during the fabrication process. In addition, the material should be capable of exhibiting surface variations, e.g., embossed or molded surface variations, that can carry precision tracking and/or preformat information. The material should be capable of encapsulating the holographic recording material to protect the holographic recording material from environmental contamination. In addition, as discussed above, the material should have relatively low birefringence. Birefringence is generally a measure of the variation of the index of refraction with orientation in the material. Large variations in the index of refraction with orientation, for instance, are generally undesirable for holographic media substrate materials.

Additionally, a material should be chosen so that surface reflection and intrinsic optical scattering are minimized as much as possible. Moreover, the medium may need an anti-reflection coating. Finally, material cost may be a factor. Considering all these factors, the thermoplastic material referred to as amorphous polyolefin (APO) appears to be well suited as a substrate material for use in holographic media. In addition to meeting the design criteria above, APO does not absorb water vapor. Therefore, if APO is used as a holographic medium substrate, an anti-reflective coating can be applied to the medium without the need to bake or de-gas the substrate.

As described above, the optimal thickness range falls between approximately 0.5 millimeters and 1.3 millimeters. Birefringence may be too high if the substrate thickness is less than 0.5 millimeters, and edge wedge may become a problem if substrate thickness is greater than 1.3 millimeters. Therefore 0.5 millimeters to 1.3 millimeters represents the optimal range for thermoplastic substrates used in sandwich construction holographic data storage media, and APO appears to be the most suitable thermoplastic material for such substrates.

Figure 8:
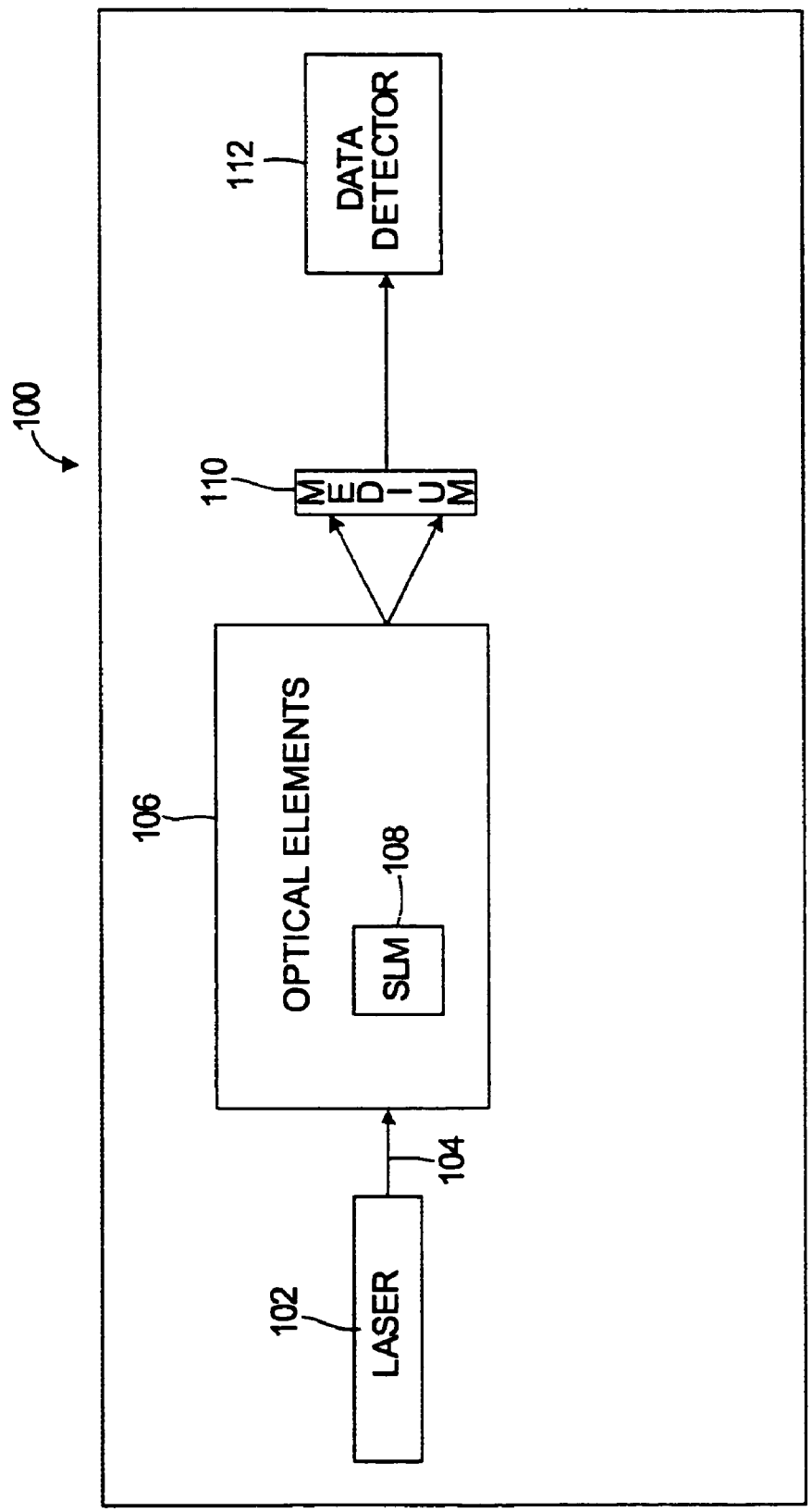
FIG. 8 illustrates a system suitable for reading and writing to a holographic recording medium.

FIG. 8 illustrates a system 100 suitable for reading and writing to a holographic recording medium. System 100 includes at least one laser 102 that produces laser light 104. Laser light 104 passes through optical elements 106. For instance, optical elements 106 may include one or more beam splitters, lenses and mirrors. A data encoder, such as SLM 108 may be positioned within the optical elements to encode data in the laser light 104. By way of example, the optical elements 106 may conform to the optical arrangement shown in FIG. 1, although the scope of the invention is not limited in that respect. Medium 110 is positioned where it can be written with holographic bit maps. Medium 110, for instance may include one or more of the features described above, including thin substrate portions. Each substrate portion, for instance, may have a thickness less than or equal to approximately 2 millimeters, less than or equal to approximately 1.2 millimeters, or even less than or equal to approximately 0.6 millimeters. Moreover, each substrate portion may fall within the optimal thickness range of approximately 0.5 millimeters to 1.3 millimeters.

Data detector 112 such as a camera is positioned to detect data encoded bit maps on medium 110. A tracking detector (not shown) such as a PSD, a segmented detector array, a two-element photodetector or the like, may be positioned to detect light diffracted from medium 110 in a manner that enables system 100 to accurately locate track locations on medium 110.

In the system, at least one laser 102 may be carried on a record/read head (not shown). Additional lasers (not shown) may also be carried on the record/read head. In this manner, laser 102 may be properly positioned to read and write holograms on the medium 110.

Various embodiments of the invention have been described. For example, a sandwich construction holographic data storage medium has been described. The substrate portions of medium may be of adequate thickness to overcome edge wedge problems. Moreover, the medium may form part of a holographic data storage system. These and other embodiments are within the scope of the following claims.

The invention claimed is:

1. A method of fabricating a holographic data storage medium comprising:
    injection molding a first substrate portion and a second substrate portion;
    depositing a photopolymer between the first and second substrate portions;
    forcing the first substrate portion onto an upper reference plane of a holographic data storage medium fabrication system;
    forcing the second substrate portion onto a lower reference plane of the holographic data storage medium fabrication system; and
    curing the photopolymer.

2. The method of claim 1, wherein injection molding the first substrate portion and the second substrate portion comprise injection molding the first and second substrate portions to have first and second substrate thicknesses less than approximately 2.0 millimeters and greater than approximately 0.5 millimeters.

3. The method of claim 1 wherein depositing a photopolymer between the first and second substrate portions comprises injecting the photopolymer between the first and second substrates by center dispensing the photopolymer through an inner diameter of at least one of the substrate portions, and wherein center dispensing the photopolymer forces the first and second substrate onto the upper and lower reference planes respectively.

4. The method of claim 1, further comprising mechanically pre-calibrating the upper and lower reference planes of the holographic data storage medium fabrication system.

5. The method of claim 4, further comprising mechanically pre-calibrating the upper and lower reference planes of the holographic data storage medium fabrication system to ensure that upper and lower surfaces of a resulting fabricated medium are substantially parallel.

6. The method of claim 1, wherein injection molding the substrate portions includes embossing one or both of the substrate portions to include tracking or pre-format information.

7. The method of claim 1, further comprising applying an anti-reflective coating on one or both of the substrate portions.

8. The method of claim 7, wherein the substrate portions comprise amorphous polyolefin and wherein applying to anti-reflective coating does not include baking or de-gassing of the substrate portions.

9. A method of creating a data storage medium comprising:
    mechanically pre-calibrating an upper reference plane and a lower reference plane of a holographic data storage medium fabrication system;
    forcing the first substrate portion onto the upper reference plane of the holographic data storage medium fabrication system;
    forcing the second substrate portion onto a lower reference plane of the holographic data storage medium fabrication system;
    depositing a polymer between first and second substrate portions; and
    curing the polymer.

10. The method of claim 9, wherein the medium comprises a holographic medium and the polymer comprises a photopolymer.

11. The method of claim 9, wherein depositing the polymer between the first and second substrate portions comprises injecting the polymer between the first and second substrates by center dispensing the polymer through an inner diameter of at least one of the substrate portions and wherein center dispensing the polymer forces the first and second substrate portions onto the unper and lower reference planes respectively.

12. The method of claim 9, wherein mechanically pre-calibrating the upper and lower reference planes of the halographic data storage medium fabrication system ensures that upper and lower surfaces of the medium are substantially parallel.

13. The method of claim 9, further comprising embossing one or both of the substrate portions to include tracking or pre-format information.

14. The method of claim 9, further comprising applying an anti-reflective coating on one or both of the substrate portions.

15. The method of claim 14, wherein the substrate portions comprise amorphous polyolefin and wherein applying the anti-reflective coating does flat include baking or de-gassing of the substrate portions.

16. A method of creating a sandwiched construction holographic medium comprising:
    injection molding a first substrate portion and a second substrate portion;
    applying an anti-reflective coating on one or both of the substrate portions;
    depositing a photopolymer between the first and second substrate portions to force the first and second substrate portions onto an upper and lower reference planes respectively; and
    curing the photopolymer.

17. The method of claim 16, wherein depositing a photopolymer between the first and second substrate portions comprises injecting the photopolymer between the first and second substrates by center dispensing the photopolymer through an inner diameter of at least one of the substrate portions.

18. The method of claim 16, further comprising embossing one or both of the substrate portions to include tracking or pre-format information.

19. The method of claim 16, wherein the substrate portions comprise amorphous polyolefin end wherein applying the anti-reflective coating does not include baking or de-gassing of the substrate portions.

20. A method of fabricating a medium comprising:
    injection molding a first substrate portion and a second substrate portion;
    forcing the first substrate portion onto an upper reference plane of a holographic data storage medium fabrication systems;
    forcing the second substrate portion onto a lower reference plane of the holographic data storage medium fabrication system;
    depositing a polymer between the first and second substrate portions; and
    curing the polymer.

21. The method of claim 20, wherein the medium comprises a sandwiched construction holographic medium and the polymer comprises a photopolymer.

22. The method of claim 20, wherein injection molding the first substrate portion and the second substrate portion comprise injection molding the first and second substrate portions to have first and second substrate thicknesses less than approximately 2.0 millimeters and greater than approximately 0.5 millimeters.

* * * * *

UNITED STATES PATENT AND TRADEMARK OFFICE
CERTIFICATE OF CORRECTION

PATENT NO. : 7,034,971 B2
APPLICATION NO. : 10/962630
DATED : April 25, 2006
INVENTOR(S) : Jathan D. Edwards et al.

Page 1 of 1

It is certified that error appears in the above-identified patent and that said Letters Patent is hereby corrected as shown below:

Column 11
    Line 19, "flat" should read --not--.

Column 12
    Line 15, "holagraphic" should read --holographic--.
    Line 16, "systems" should read --system--.

Signed and Sealed this

First Day of July, 2008

JON W. DUDAS
*Director of the United States Patent and Trademark Office*